US008812042B2

(12) United States Patent
Seshadri et al.

(10) Patent No.: US 8,812,042 B2
(45) Date of Patent: Aug. 19, 2014

(54) METHOD AND SYSTEM FOR INTERRUPTED FLOOR RECOVERY IN PUSH-TO-TALK OVER CELLULAR NETWORK

(75) Inventors: Thirumalai Echampadi Seshadri, Bangalore (IN); Venkateswar Jeedigunta, Bangalore (IN); Hoskote Satyajeet, Mumbai (IN); Sung-Jin Park, Suwon-si (KR); Sang-Kyung Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 814 days.

(21) Appl. No.: 11/916,138

(22) PCT Filed: Jun. 2, 2006

(86) PCT No.: PCT/KR2006/002133
§ 371 (c)(1),
(2), (4) Date: Nov. 20, 2009

(87) PCT Pub. No.: WO2006/129985
PCT Pub. Date: Dec. 7, 2006

(65) Prior Publication Data
US 2010/0056077 A1 Mar. 4, 2010

(30) Foreign Application Priority Data

Jun. 2, 2005 (IN) .............................. 677/CHE/2005
Jun. 2, 2006 (KR) ........................ 10-2006-0049714

(51) Int. Cl.
*H04B 7/00* (2006.01)
(52) U.S. Cl.
USPC ....................................................... 455/519

(58) Field of Classification Search
CPC ...... H04B 10/40; H04W 4/027; H04W 72/04; H04W 4/08
USPC .......................................................... 455/518
See application file for complete search history.

(56) References Cited

U.S. PATENT DOCUMENTS 5,901,363 A 5/1999 Toyryla
6,771,633 B1 8/2004 Mizoguchi
(Continued)

FOREIGN PATENT DOCUMENTS

JP 1-177756 A 7/1989
JP 2001-077924 A 3/2001
(Continued)

OTHER PUBLICATIONS

Push to talk over Cellular (PoC)-Architecture, Candidate Version 1.0—Apr. 28, 2005, Open Mobile Alliance.*

*Primary Examiner* — Ankur Jain
(74) *Attorney, Agent, or Firm* — Jefferson IP Law, LLP

(57) ABSTRACT

As described above, when a particular PoC client participating in a PoC session requests media transmission to a PoC server during transmission of media from another PoC client, the PoC server transitions the PoC client with the floor to a suspended state by sending an MB Suspend message and grants the floor to the requesting PoC client. After media transmission of the interrupting PoC client, the PoC server returns the floor to the interrupted PoC client. Therefore, the privileged PoC client in a current PoC infrastructure interrupts the ongoing conversation and sends media, after which the floor is returned to the interrupted PoC client without issuing an explicit media request from the interrupted PoC client. Even in the pre-emptive case scenario where the pre-emptive PoC client interrupts the ongoing conversation, the conversation can be continued in a natural way.

12 Claims, 4 Drawing Sheets

(56) References Cited

U.S. PATENT DOCUMENTS

| | | |
|---|---|---|
| 7,266,382 B2 | 9/2007 | Noel et al. |
| 7,778,655 B2 * | 8/2010 | Huh et al. .................... 455/519 |
| 2002/0077136 A1 * | 6/2002 | Maggenti et al. ............ 455/518 |
| 2005/0032539 A1 | 2/2005 | Noel et al. |
| 2006/0105793 A1 * | 5/2006 | Gutowski et al. ............ 455/518 |

FOREIGN PATENT DOCUMENTS

| | | |
|---|---|---|
| JP | 2005-057785 A | 3/2005 |
| WO | WO 00/40045 A1 | 7/2000 |
| WO | WO 03/069944 A1 | 8/2003 |
| WO | WO 04/002071 A1 | 12/2003 |

* cited by examiner

METHOD AND SYSTEM FOR INTERRUPTED FLOOR RECOVERY IN PUSH-TO-TALK OVER CELLULAR NETWORK

TECHNICAL FIELD

The present invention relates to a system and method for providing a mechanism for recovery of an interrupted floor during a media control procedure.

BACKGROUND ART

PoC service defines various requirements considering different PoC user groups and the nature of participation of the PoC users in the PoC groups. One unique feature of the PoC service is to prioritize media control requests. When a PoC user requests for media according to his priority, a controlling PoC server entity identifies the media request along with the priority of the user.

Currently, three priority levels are defined in the PoC service, namely, normal user, high-priority user, and pre-emptive user. A normal PoC server grants a media floor to media requests as the requests come in order. When more than one normal PoC user makes a media request, their requests will be queued in the order they come. A high-priority PoC user has a higher priority, compared to normal PoC users, when his media request is queued for the media floor. Even though the high-priority PoC user requests the floor later than a normal PoC user, his request is queued with priority over the request from the normal user to get the floor earlier. If queuing of media requests is not supported, the floor is granted to users in the order that their requests come irrespective of their priority levels. A user can't take precedence over other users who have requested with the same priority. In such a case, their media requests will be queued in the order that they come in.

A PoC user requesting with pre-emptive priority will normally get the floor immediately irrespective of other normal or high-priority PoC users are sending media when he requests the floor. Hence, at the moment the pre-emptive PoC user requests the floor, the media burst transmission from the normal or high-priority PoC user is interrupted.

FIG. 1 illustrates a media controlling procedure when a pre-emptive PoC user requests for media.

Referring to FIG. 1, PoC Client B sends media in a PoC session in steps 100 to 103. PoC Client A being a pre-emptive PoC user needs to immediately send media during receiving the media from PoC Client B and thus sends a Media Burst Request message to a controlling PoC server in steps 104 and 105.

Controlling PoC Server X (controlling) determines whether PoC Client B has a pre-emptive right. If PoC Client B is not a pre-emptive user, Controlling PoC Server X revokes the permission to send the media from PoC Client B by sending a Stop Talk Burst message, subject to the server policy in steps 106 and 107.

PoC Client B sends to PoC Server X the last buffered media packet in steps 108 and 109 and sends a Media Burst Complete message to Controlling PoC Server X in steps 112 and 113.

In steps 110 and 111, Controlling PoC Server X forwards the last media packet received from PoC Client B to PoC Client A. It also sends a Media Burst Confirm message to PoC Client A in steps 114 and 115.

Upon receipt of the Media Burst Confirm message, PoC Client A notifies PoC User A that media transmission is available. PoC Client A then begins to send media to Controlling PoC Server in steps 116 and 117. Controlling PoC Server forwards the media to the other PoC clients participating in the PoC session except for the transmitting PoC user in steps 120 and 121. Before the media forwarding, Controlling PoC Server notifies the other PoC clients that the pre-emptive PoC user will send media by sending a Receiving Media Burst message.

DISCLOSURE OF INVENTION

Technical Problem

In the foregoing conventional art, the pre-emptive PoC user is allowed to interrupt an ongoing conversation to make an important announcement, but the right to talk is not returned to the PoC user who was interrupted, after the talk from the pre-emptive user. That is, once his conversation is interrupted, the interrupted PoC user will completely loose the right to talk and may be posted last in the queue in case that he attempts to talk again. This may be a bad user experience from the interrupted user's point of view, and this behavior may not be liked by the interrupting PoC user whose intention was not really to revoke the right to talk completely rather than temporarily.

Technical Solution

The present invention provides a system and method for allowing PoC users privileged in a current PoC infrastructure to temporarily interrupt an ongoing media transmission to make a critical announcement and recovering the interrupted media transmission.

A system for recovering a floor interrupted by a pre-emptive priority PoC user in a PoC (Push to talk over Cellular) system includes a PoC client for, upon request for media transmission from a PoC user, sending a floor request message to a PoC server, sending media upon receipt of a media burst confirm message from the PoC server, and sending a media burst complete message when the media is completely transmitted, and the PoC server for, upon receipt of the floor request message, sending a media burst suspend message to a PoC client currently sending media, and sending a media burst confirm message to the interrupted PoC client to allow the interrupted PoC client to resume the media transmission, upon receipt of the media burst complete message from the PoC client.

Also, a method of stopping media transmission by a particular PoC client participating in a PoC session in a PoC (Push to talk over Cellular) system includes the steps of sending, upon request for media transmission during receiving media in the PoC session, a floor request message by a PoC client, sending, upon receipt of the floor request message, a media burst suspend message to a PoC client currently sending media, and sending a media burst confirm message to the PoC client requesting the media transmission by a PoC server, sending media, upon receipt of the media burst confirm message by the PoC client, sending a media burst complete message to the PoC server by the PoC client, when the media transmission is completed, and sending a media burst confirm message to the interrupted PoC client in order to indicate that the PoC client can resume the media transmission, upon receipt of the media burst complete message from the PoC client by the PoC server.

Advantageous Effects

As described above, when a particular client participating in a PoC session requests a floor to a PoC server during transmission of media from another client, the PoC server transitions the client with the floor to a suspend state by sending an Media Burst Suspend message and grants the floor to the requesting client. After media transmission of the interrupting client, the PoC server returns the floor to the interrupted client. Therefore, the privileged PoC client interrupts the ongoing conversation and sends media, after which the floor is returned to the interrupted PoC client without issuing an explicit media request from the interrupted PoC client. Even in the pre-emptive case scenario where the pre-emptive PoC client interrupts the ongoing conversation, the conversation can be continued in a natural way.

BEST MODE FOR CARRYING OUT THE INVENTION

Figure 1:
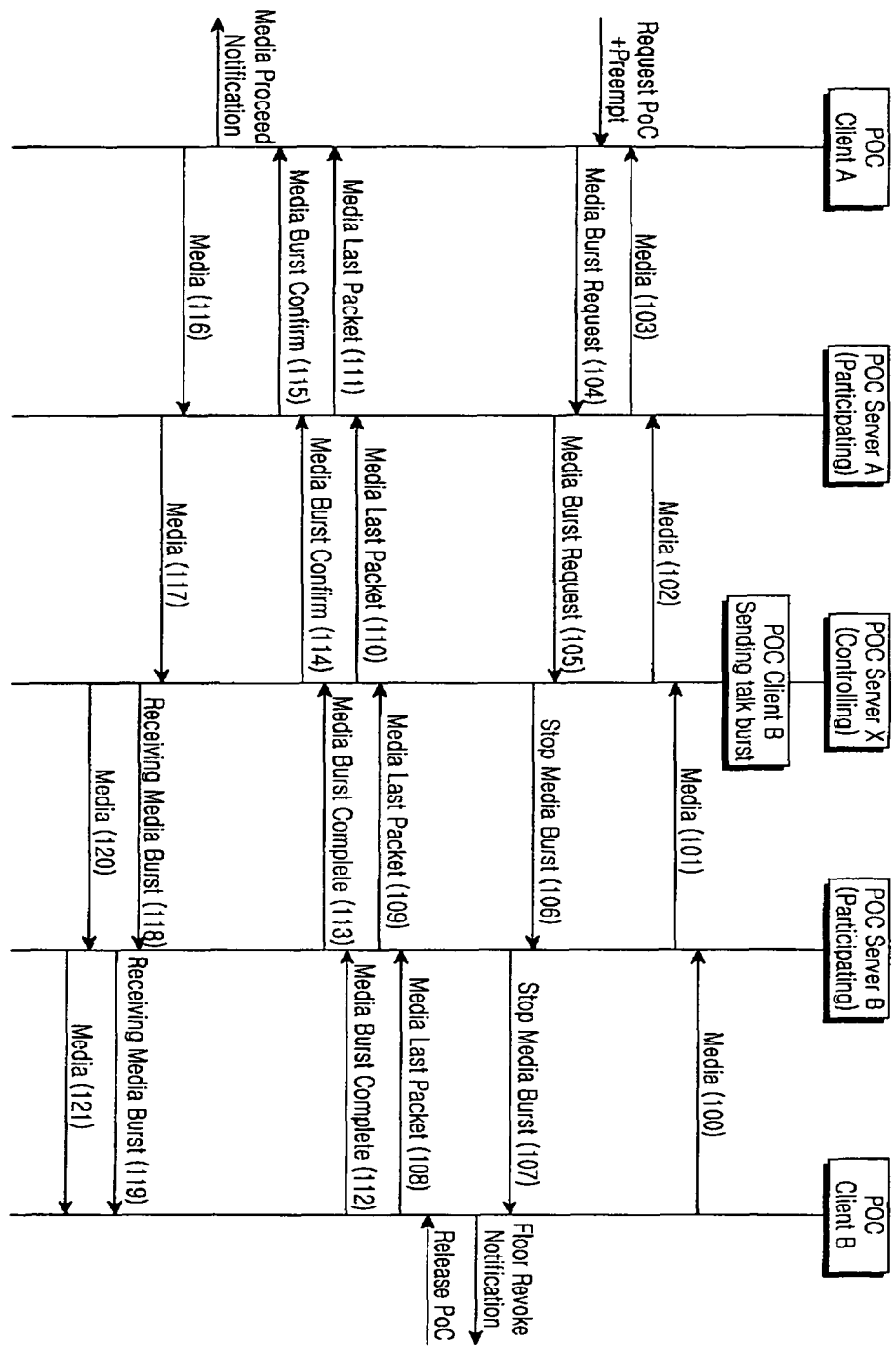
FIG. 1 is a diagram illustrating a media transmission signal flow using pre-emptive priority.

Preferred embodiments of the present invention will be described herein below with reference to the accompanying drawings. In the following description, well-known functions or constructions are not described in detail since they would obscure the invention in unnecessary detail.

The present invention is intended to allow a privileged PoC user to interrupt an ongoing media transmission from another PoC user to send his media, after which the right to talk is returned to the PoC user who was interrupted.

SIP (Session Initiation Protocol) or Extended SIP, an application-layer protocol for controlling Internet multimedia communication (IP telephony), is basically used as a signaling protocol to establish a group PoC (Push to talk over Cellular) call. RTP (Real Time Protocol) and RTCP (Real Time Control Protocol) are used for the actual transmission of media and media-related control information respectively. The RTCP is also used as a media control mechanism which allows only one of PoC users to send the media information at a time, since PoC is a half-duplex service in principle. Environment setting-related information can be included, for transmission by SDP (Session Description Protocol). The environment setting-related information defines media information used in an established session, a port number used in each media, CODEC information, and bandwidth. That is, voice, video, pictures, and text can be used as media in one PoC session. Therefore, the right to send media includes the right to speak, i.e. the floor. The SIP and SDP are sent in an INVITE message, for PoC session establishment.

According to the present invention, it is assumed that a PoC user has requested for media transmission and is sending media in a PoC session. It is assumed that a PoC system implements queue capability for reserving media requests, and respective PoC users will be granted the floor when their orders come. The PoC system makes use of RTP (Real Time Protocol) and RTCP (Real Time Control Protocol) for media and media-related signaling and media arbitration. The media includes all types of media such as voice, image, text, video, file, etc, especially Talk defined by OMA PoC v1. Hence, TB (Talk Burst) described in the drawings is considered a kind of media burst.

Figure 2:
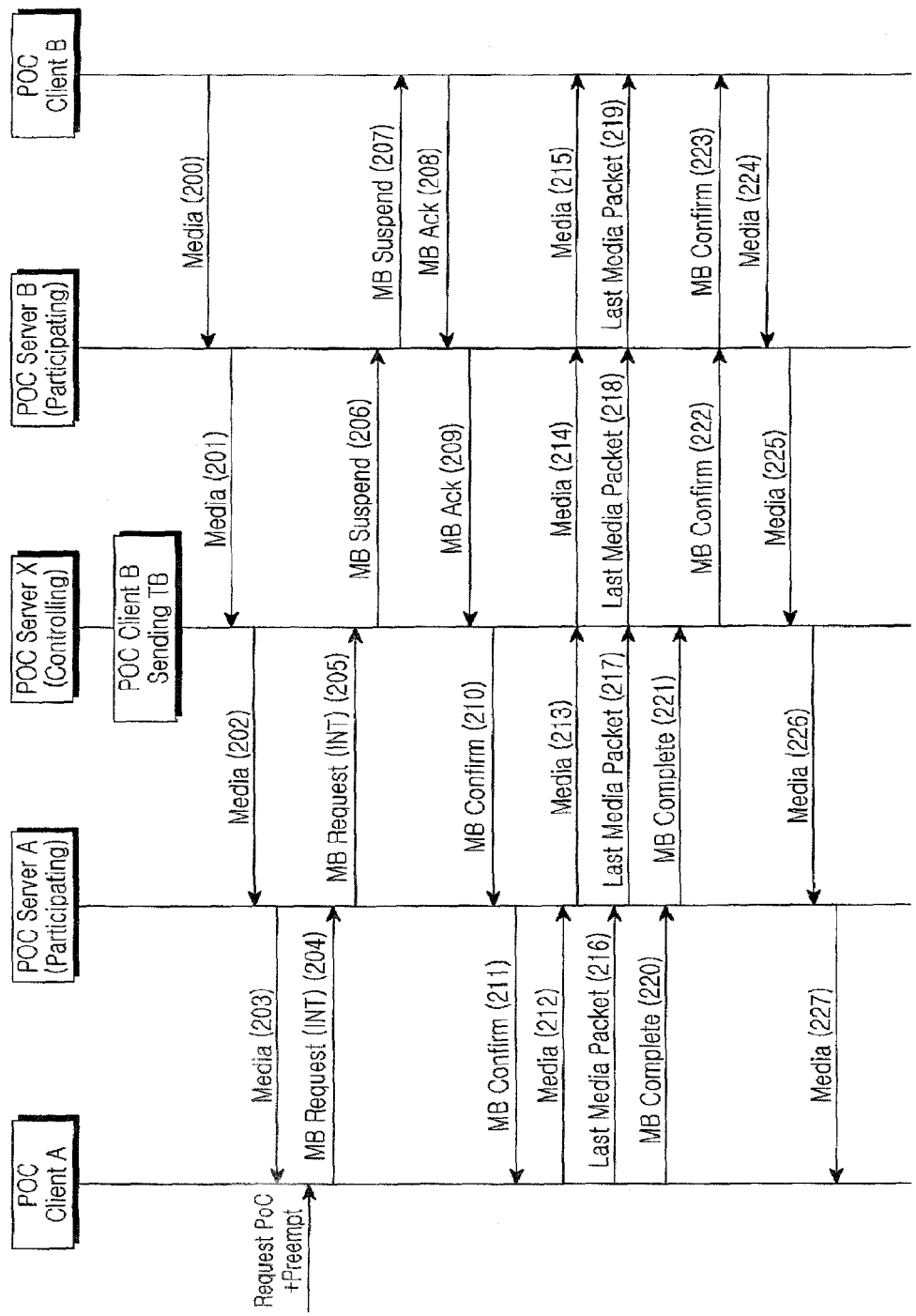
FIG. 2 is a diagram illustrating a message signal flow between a PoC client and a PoC server according to an embodiment of the present invention.

This invention proposes new requirements in a media arbitration procedure when media requests are prioritized. Accordingly, a new media arbitration method is required. FIG. 2 is a diagram illustrating a message signal flow between a PoC client and a PoC server according to an embodiment of the present invention.

A PoC session has been established between PoC Client A and PoC client B. If there are some other PoC users who have already requested media, their requests have been queued in order.

PoC Client B sends media to PoC client A in steps 200 to 203. PoC group members participating in the PoC session, including PoC Client A, receive the media sent by PoC Client B. When PoC User A wants to send media in order to make an important announcement, PoC User A using PoC Client A sends an MB Request (INT) message to Controlling PoC Server X in steps 204 and 205. It is assumed herein that PoC User A is one of a pre-emptive priority user or an interrupt priority user.

Upon receipt of the media burst request from PoC Client A via Participating PoC Server A, Controlling PoC Server X recognizes that PoC User A wants to interrupt an ongoing media transmission, and it sends an MB Suspend message to POC Client B via Participating PoC Server B in steps 206 and 207. The MB Suspend message contains an indication that the floor will be returned after the media transmission of the pre-emptive priority PoC user. Upon receipt of this MB Suspend message, PoC Client B stops sending the media. Then PoC Client B sends an MB Ack message to PoC Server X in steps 208 and 209. The operation of steps 108 to 113 of FIG. 1 is performed in the same manner and its description will not be provided herein.

Controlling PoC Server X sends an MB Confirm message to PoC Client A in steps 210 and 211. PoC Client A which has received the MB Confirm message from Controlling PoC Server X sends media to everybody participating in the PoC session including PoC Client B in steps 212 to 215. Every client participating in the PoC session receives the media sent by PoC Client A.

After completing the media transmission of up to the last packet in steps 216 to 219, PoC Client A sends an MB Complete message to Controlling PoC Server in steps 220 and 221. Controlling PoC Server X then sends an MB Confirm message back to PoC Client B so that the temporarily suspended media transmission will resume in steps 222 and 223.

PoC User B which has received the MB Confirm message recognizes that it is capable of sending the media and sends the media to all other clients participating in the PoC session in steps 224 to 227. Every client of the PoC session receives the media sent by PoC Client A.

Meanwhile, in steps 206 and 207, Controlling PoC Server X may send the Stop Media Burst message illustrated in FIG. 1 or the MB_Suspend message in order to indicate that media transmission from a PoC client is discontinued. These two messages commonly request media transmission discontinuation and indicate that the interrupted media transmission will resume after the media transmission of the pre-emptive PoC user.

Figure 3:
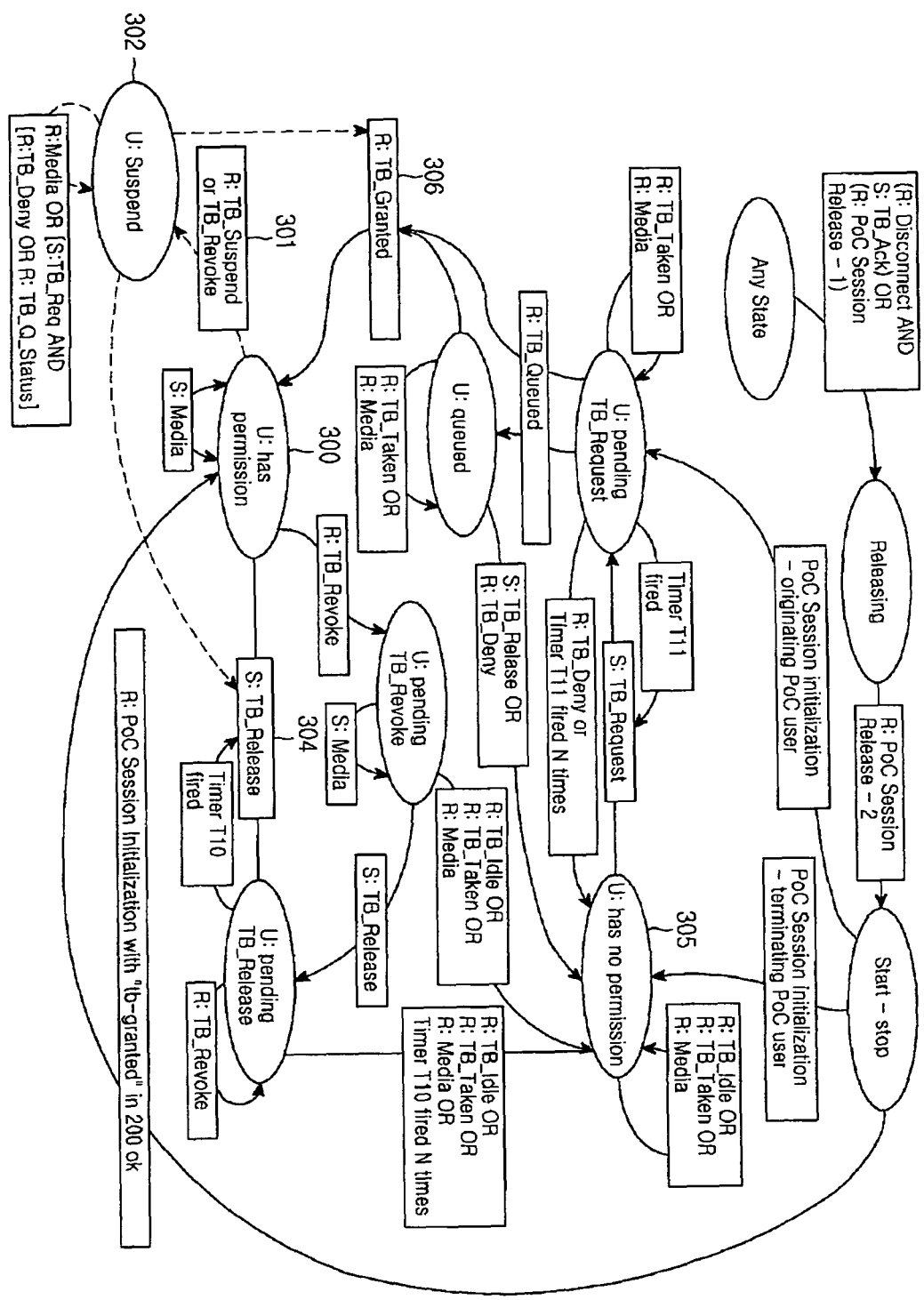
FIG. 3 is a state diagram of the PoC client according to an embodiment of the present invention.
Figure 4:
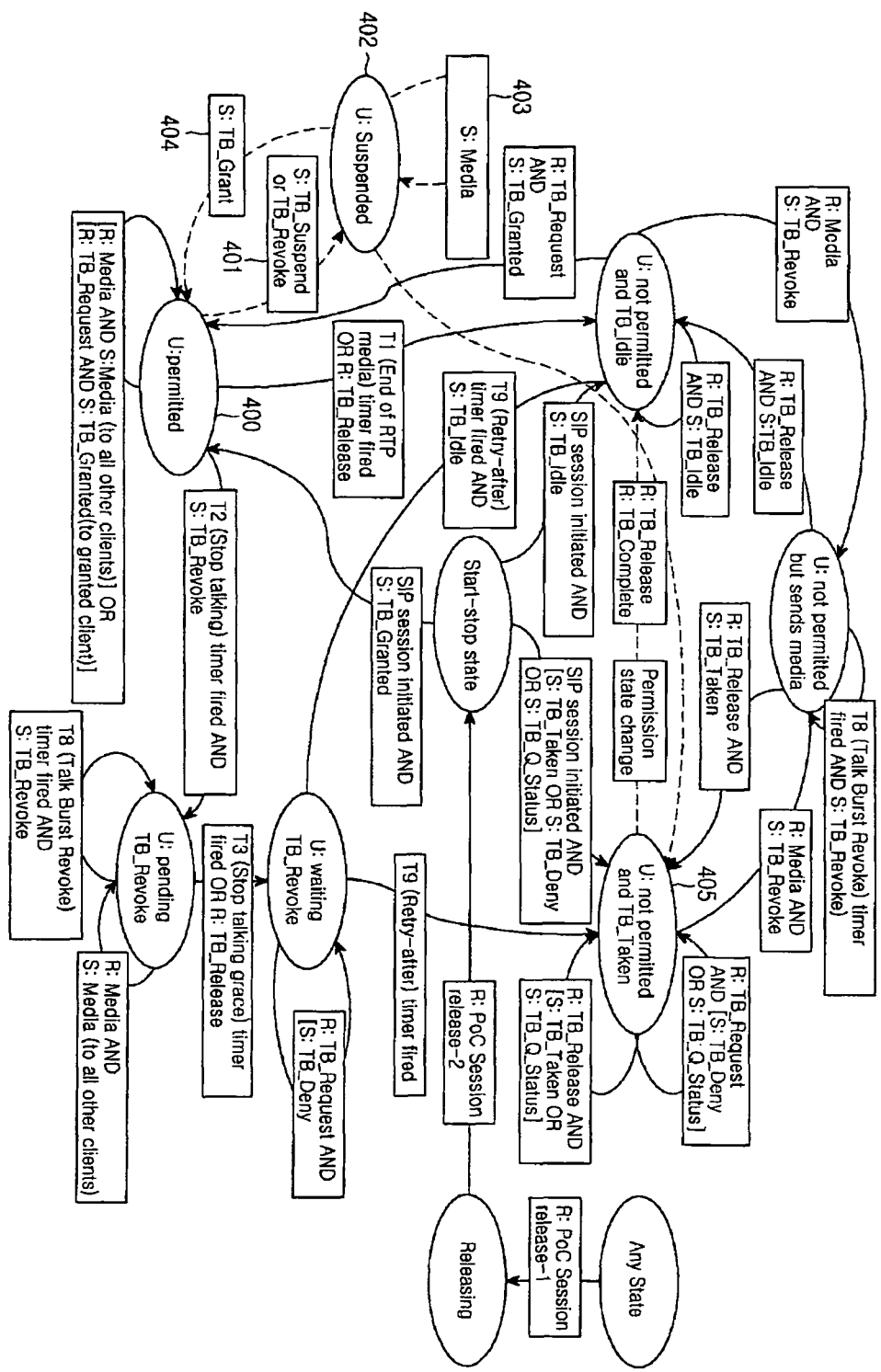
FIG. 4 is a state diagram of the PoC server according to an embodiment of the present invention.

FIG. 3 is a state diagram of the PoC client in the media controlling procedure according to an embodiment of the present invention. Talk Burst messages described in FIGS. 3 and 4 are an example of Media Burst messages. Hence, the present invention is applicable to other media as well as voice.

According to the procedure of the present invention, there is a new state introduced to apply the interrupt behavior for the interrupted PoC client. The new state is a state where upon receipt of the MB Suspend message from the controlling PoC server during media transmission, the PoC client stops the media transmission and his media burst request is queued in the first place. Accordingly, the interrupted PoC Client shall not be allowed to send the media and it should be listening to receive the media originated from the interrupting pre-emptive PoC client in this new state, and after the media transmission of the pre-emptive PoC client, the interrupted PoC client resumes his suspended media transmission.

In the following description, we will assume voice media as an example in the media controlling procedure. Hence, the terms "Media transmission" is a kind of media and used interchangeably.

Referring to FIGS. 2 and 3, initially PoC Client B is sending media in a state 300. Upon receiving a TB_Suspend message as indicated by reference numeral 301, PoC client B enters into a U: Suspend state 302 and behaves as follows.

Upon receipt of the TB_Suspend message from the controlling PoC server, the PoC client enters the U: Suspend state 302. The controlling PoC server places the media of the interrupted client in a queue so that the media can be sent immediately after the media transmission of the pre-emptive PoC server.

If the PoC user wants to send the media no longer in the U: Suspended state, the PoC client may cancel his media right stored in the queue by sending a TB_Release message 304. That is, the PoC client transitions from the U: Suspended state to a U: Has No Permission state 305 as the media right is eliminated from the queue by the TB_Release message.

If the interrupted PoC client wants to resume the media transmission, the controlling PoC server re-grants the floor to the interrupted PoC user by sending an MB_Grant message (TB_Grant message in the figure), upon completion of the media transmission of the pre-emptive PoC user.

Upon receipt of the MB_Grant message 306 (the TB_Grant message in the figure) in the U: Suspended state 302, the PoC client moves to the U: Has Permission state 300 and starts sending the media again.

Referring to FIG. 4, the state transitions of the PoC user under the control of the PoC server according to an embodiment of the present invention are given as follows.

A U: Suspend state 402 indicates a state where that the PoC client is not allowed to send the media and should be listening to receive the media originated from the pre-emptive PoC client. When the PoC server sends a TB_Suspend or TB_Revoke message 401 to the PoC client, upon request from the PoC user, the PoC user enters into the U: Suspended state.

If the pre-emptive PoC user continues to send media to the PoC user via the controlling PoC server as indicated by reference numeral 403, the PoC user stays in the U: Suspended state.

Upon receipt of an R: TB_Release message from the PoC client, the controlling PoC server cancels his media right stored in the queue and transitions the PoC user from the U: Suspended state to a 'U: Not Permitted AND TB_Taken state' 405.

If the PoC server receives an R: TB_Release message from the pre-emptive PoC user instead of the PoC user, it sends a TB_Grant message to the PoC user. The PoC user transitions from the 'U: Suspended' state to a 'U: Permitted' state.

The MB Request message sent from the pre-emptive PoC client to the PoC server will be described with reference to Table 1 below.

The TBCP MB Request message is a request sent from the PoC client to the PoC server to get permission to send media. The PoC server can determine from this message which PoC user wants to send media.

TABLE 1

| V = 2 | P | 00000 | PT = APP = 204 | Length |
|---|---|---|---|---|
| SSRC of PoC Client requesting permission to send a talk burst name = PoC1 ||||||
| Option ID | | Option Length | | Option Value |
| Option ID | | Option Length | | Option Value |

The bit pattern 00000 in the subtype field is used for the MB Request message. The SSRC (Synchronization source) field carries the SSRC of the PoC client requesting permission to send media.

One or more option fields may be included in MB Request message. Each MB Request message option field includes three subfields.

The first subfield is the Option ID subfield. The Option ID subfield identifies the option selected as an 8-bit Option ID.

The second subfield is the Option Length subfield. The Option Length subfield is one byte giving the length of the Option field in bytes. The value of the Option Length subfield is equal to the sum of the number of bytes in the Option ID, Option Length and Option Value subfields.

The third subfield is the Option Value subfield. The Option Value subfield has an integer number of bytes. The format and value of this subfield is option-dependent.

The following subclauses define the specified MB Request message Option subfields.

Regarding media request priority levels, a media request priority level option is included if the PoC client and the PoC server have agreed to support queuing of media requests. Notably, in the case of pre-emptive priority, the option is included even if queuing is not supported.

The PoC client includes the priority level field if the PoC user has indicated that the media request is desired at a level other than normal priority, or if the PoC client wishes to change the priority level of a queued media request.

The Option ID subfield has the value 1. The Option Length subfield has the value 3. The Option Value subfield is a single byte giving a defined media request priority level.

The defined media request priority levels that can be included in the MB Request message are
1. normal priority
2. high priority
3. pre-emptive priority
4. interrupt priority As described above, the MB Request message indicating the interrupt priority includes a new value (i.e. 4) in the Option Value field. Alternatively instead of the interrupt priority value, an interrupt priority option can be set in the MB request message using a new Option ID subfield.

The above-described operation of the present invention can be implemented with an MB Request message with pre-emptive priority and the PoC server operation. Also, the same effects can be achieved using an MB Request message with the new interrupt priority.

There can be a new TBCP message to indicate the media transmission suspension and queuing of the interrupted media request to the PoC client.

This MB Suspend message will be described with reference to Table 2.

TABLE 2

| V = 2 | P | XXXXX | PT = APP = 204 | Length |
|---|---|---|---|---|
| SSRC of PoC Client requesting permission to send a talk burst name = PoC1 |||||

A separate unique bit pattern in the subtype field is used for the MB Suspend message. In Table 2, "XXXXX" bits represent a unique number identifying the MB Suspend message in the present invention.

The application-dependent data field carries a reason in a Reason code field why the PoC server performing the controlling PoC function wants the PoC client to stop sending media Also, additional information can be carried in the additional information field and thus the length of the packet may vary depending on the value of the Reason code field.

The SSRC field carries the SSRC of the PoC server performing the controlling PoC function.

The MB Suspend message is sent from the PoC server performing the controlling PoC function to the PoC client with permission to send media in order to command it to stop sending media.

In accordance with the present invention as described above, a modification is made to the conventional media request procedure to trigger a PoC server operation which allows a pre-emptive PoC user to interrupt a current media transmission from a PoC user having the right to send media and to send his media. This is done by introducing a new priority level or extending the pre-emptive priority model.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A method for recovering a floor interrupted by a first PoC client in a PoC (Push to talk over Cellular) system, the method comprising:
   receiving, from a second PoC client, by the first PoC client, a portion of a first media, the first media to be transmitted to the first PoC client by the second PoC client;
   sending, by the first PoC client, a floor request message to a PoC server upon request for media transmission from a PoC user while receiving the portion of the first media, wherein when the floor request message is received, the PoC server sends a media burst suspend message to interrupt the second PoC client currently sending the first media;
   upon receipt of a media burst confirm message from the PoC server, sending, by the first PoC client, a second media to all other PoC clients participating in a PoC session including the second PoC client prior to receiving a remaining portion of the first media from the second PoC client;
   if the second media is completely sent from the first PoC client, sending, by the first PoC client, a media burst complete message to the PoC server so that the PoC server can send a media burst confirm message to the second PoC client to allow the second PoC client to send the remaining portion of the first media; and
   receiving, by the first PoC client, the remaining portion of the first media from the second PoC client,
   wherein the media burst suspend message is sent to the second PoC client so that the second PoC client is prevented from sending any media until the second PoC client receives a media burst confirm message.

2. The method of claim 1, wherein the floor request message is a media burst request message.

3. The method of claim 1, wherein the PoC server places the second PoC client in foremost place of a queue, when sending the media burst suspend message to the second PoC client.

4. The method of claim 1, wherein the first PoC client has one of a pre-emptive priority and an interrupt priority.

5. A method for transmitting in a PoC (Push to talk over Cellular) system, the method comprising the steps of:
   sending, by a PoC server, a portion of a first media from a second PoC client to all other PoC clients participating in a PoC session including a first PoC client;
   receiving, by the PoC server, a floor request message from the first PoC client requesting for media transmission during sending the first media in the PoC session;
   sending, by the PoC server, upon receipt of the floor request message, a media burst suspend message to interrupt the second PoC client currently sending the first media;
   sending, by the PoC server, a first media burst confirm message to the first PoC client so that the first PoC client can send a second media;
   sending, by the PoC server, the second media from the first PoC client to all other PoC clients participating in the PoC session including the second PoC client prior to receiving a remaining portion of the first media from the second PoC client;
   receiving, by the PoC server, a media burst complete message from the first PoC client, if the second media is completely sent from the first PoC client;
   sending, by the PoC server, a second media burst confirm message to the second PoC client in order to indicate that the second PoC client can send the remaining portion of the first media; and
   sending, by the PoC server, the remaining portion of the first media from the second PoC client to all other PoC clients participating in the PoC session including the first PoC client,
   wherein the media burst suspend message is sent to the second PoC client so that the second PoC client is prevented from sending any media until the second PoC client receives the second media burst confirm message.

6. The method of claim 5, wherein the floor request message is a media burst request message.

7. The method of claim 5, further comprising a step of placing the second PoC client in foremost place of a queue by the PoC server, when sending the media burst suspend message to the second PoC client.

8. The method of claim 5, wherein the first PoC client has one of a pre-emptive priority and an interrupt priority.

9. A method for recovering a floor interrupted by a first PoC client in a PoC (Push to talk over Cellular) system, the method comprising:
   transmitting, by a second PoC client, a portion of a first media, the first media to be transmitted to the first PoC client by the second PoC client;
   receiving, by the second PoC client, a media burst suspend message to interrupt the second PoC client currently sending the first media from a PoC server when the PoC server receives a floor request message from the first PoC client while transmitting the portion of the first media;
   upon receipt of a media burst confirm message from the PoC server to the first PoC client, receiving, by the second PoC client, a second media to be transmitted to all other PoC clients participating in a PoC session including the second PoC client prior to transmitting a remaining portion of the first media;
   if the second media is completely sent from the first PoC client, sending by the first PoC client a media burst complete message to the PoC server, and receiving, by the second PoC client, a media burst confirm message from the PoC server to allow the second PoC client to send the remaining portion of the first media; and transmitting, by the second PoC client, the remaining portion of the first media to the first PoC client, wherein the media burst suspend message is sent to the second PoC client so that the second PoC client is prevented from sending any media until the second PoC client receives a media burst confirm message.

10. The method of claim 9, wherein the floor request message is a media burst request message.

11. The method of claim 9, wherein the PoC server places the second PoC client in foremost place of a queue, when sending the media burst suspend message to the second PoC client.

12. The method of claim 9, wherein the first PoC client has one of a pre-emptive priority and an interrupt priority.

\* \* \* \* \*